United States Patent [19]

Kawabata et al.

[11] Patent Number: 5,693,160
[45] Date of Patent: Dec. 2, 1997

[54] LOW ASPECT RATIO PNEUMATIC TIRE MOLDED IN SPECIFIED MOLD

[75] Inventors: Misao Kawabata, Saitama; Kazuo Hayashi, Tokyo, both of Japan

[73] Assignee: Bridgestone Corporation, Tokyo, Japan

[21] Appl. No.: 565,211

[22] Filed: Nov. 30, 1995

Related U.S. Application Data

[62] Division of Ser. No. 317,479, Oct. 4, 1994, abandoned.

[30] Foreign Application Priority Data

Oct. 12, 1993 [JP] Japan ..................... 5-254291

[51] Int. Cl.$^6$ .................... B29C 35/00; B29C 35/02; B60C 3/00; B60C 3/04
[52] U.S. Cl. .................... 152/209 A; 152/209 R; 152/454; 152/456; 264/315; 264/326; 425/28.1; 425/35
[58] Field of Search ............... 425/35, 28.1; 152/209 R, 152/456, 209 A, 209 WT, 454, 531; 264/326, 315

[56] References Cited

U.S. PATENT DOCUMENTS

| | | | |
|---|---|---|---|
| 3,517,720 | 6/1970 | Brown | 152/454 |
| 3,542,107 | 11/1970 | Mills et al. | 425/35 |
| 3,599,695 | 8/1971 | Knight | 152/454 X |
| 3,693,690 | 9/1972 | Mill et al. | 152/454 |
| 3,735,791 | 5/1973 | McKissick et al. | 152/454 |
| 4,044,810 | 8/1977 | Taniguchi et al. | 152/454 X |
| 4,086,047 | 4/1978 | Johnsen | 425/46 |
| 4,402,356 | 9/1983 | Musy | 152/193 |
| 4,722,378 | 2/1988 | Carolla et al. | 152/209 R |
| 4,932,452 | 6/1990 | Kawabata et al. | 152/454 |
| 5,058,646 | 10/1991 | Kajikawa et al. | 152/454 |
| 5,299,612 | 4/1994 | Saito et al. | 152/454 X |

FOREIGN PATENT DOCUMENTS

| | | | |
|---|---|---|---|
| 1957213 | 6/1970 | Germany . | |
| 61-157403 | 7/1986 | Japan . | |
| 62-189115 | 8/1987 | Japan . | |
| 63-162307 | 7/1988 | Japan . | |
| 2147407 | 6/1990 | Japan | 152/454 |
| 3167007 | 7/1991 | Japan . | |
| 65207 | 3/1992 | Japan . | |
| 4110208 | 4/1992 | Japan . | |
| 2092963 | 8/1982 | United Kingdom . | |

*Primary Examiner*—Adrienne C. Johnstone
*Attorney, Agent, or Firm*—Sughrue, Mion, Zinn, Macpeak & Seas

[57] ABSTRACT

A pneumatic tire the aspect ratio of which is not more than 50% has, for reinforcing a tread portion, a belt comprising at least two rubber coated cord layers having cords arranged obliquely at angles with respect to an equatorial plane of the tire of 26° or more, and a belt reinforcing layer arranged outside the belt and comprising at least one organic fiber cord layer having cords arranged substantially parallel with respect to the equatorial plane of the tire. The tire is molded in a mold with a cross-sectional profile of a molded surface facing the tread portion having a radius smaller than that of a nominal tire cross-sectional profile by 1% or more of a section width of the tire and forming a convex curve to a cavity.

6 Claims, 5 Drawing Sheets

LOW ASPECT RATIO PNEUMATIC TIRE MOLDED IN SPECIFIED MOLD

This is a division of application Ser. No. 08/317,479 filed Oct. 4, 1994, now abandoned.

BACKGROUND OF THE INVENTION

1. Field of the Invention

This invention relates to a mold used for vulcanizing a pneumatic tire having an aspect ratio of not more than 50%, preferably a tire having a size of 255/50R16 or more. The mold of this invention makes it possible to manufacture a tire with excellent cornering performance as well as high speed durability.

2. Description of the Prior Art

In order to meet the demand for high performance pneumatic tires, low profile tires have been developed. In particular, in high performance tires having sizes of 255/50R16 or more, large cord angles of the belt layer, for instance 26° or more with respect to an equatorial plane of the tire, have been adopted in order to obtain high speed durability and riding comfortability.

Generally, a cross-sectional profile of a mold surface facing a tread portion forms a concave curve to a cavity.

In high performance tires which are manufactured by conventional molds, the circumferential tension of the belt is lower than that of the belt of a conventional tire whose cords are arranged normally (approximately 20° with respect to an equatorial plane of the tire). Therefore, as shown in FIG. 7 of the accompanying drawings, a radius 10 of the tire inflated with standard inner pressure (chain line) tends to be enlarged compared with a nominal radius 8 of the tire (broken line).

In a low profile high performance tire, a foot-print should be a rectangular shape. However, in the above mentioned tire, because the radius of the tire inflated with standard inner pressure tends to be enlarged when compared with the nominal radius, resulting in increasing a contact pressure of a center portion caused by enlargement of the center portion, the foot-print becomes an elliptical shape whose contact area of both sides of the tread is decreased as shown in FIG. 5 of the accompanying drawings. Tires having such foot-print cannot provide enough cornering performance because of the small contact area of both sides of the tread. Further, the contact pressure converges to the center area of the tread, and tread rubbers of the center area partially generate heat. As a result, the high speed durability of the tire deteriorates.

Therefore, it is an object of this invention to provide a mold used for vulcanizing a pneumatic tire which has excellent cornering performance and high speed durability by preventing enlargement of the radius of the tire compared to the nominal radius under standard inner pressure. By "the nominal radius" there is meant the dimension of the tire based on the tire regulations of each country.

SUMMARY OF THE INVENTION

The present invention provides a mold for vulcanizing a pneumatic tire the aspect ratio of which is not more than 50% and having, for reinforcing a tread portion, a belt comprising at least two rubber coated cord layers having cords arranged obliquely at angles with respect to an equatorial plane of the tire of 26° or more, and a belt reinforcing layer arranged outside the belt comprising at least one organic fiber cord layer having cords arranged substantially parallel with respect to the equatorial plane of the tire, wherein a cross-sectional profile of a mold surface facing the tread portion has a radius smaller than that of a nominal tire cross-sectional profile by 1% or more of a cross-sectional width of the tire and forms a convex curve to a cavity.

The aspect ratio of a tire is, as generally understood, the ratio of the tire height H to the tire section w, that is H/w expressed as a percentage.

The difference of the radius of 1% or more of the tire section width is practically at least 2.5 mm or more.

Preferably the cross-sectional profile of the mold surface facing the tread portion has a radius smaller than that of a tire nominal cross-sectional profile by 1% or more and 2% or less of the tire section width.

DESCRIPTION OF THE PREFERRED EMBODIMENTS

Figure 1:
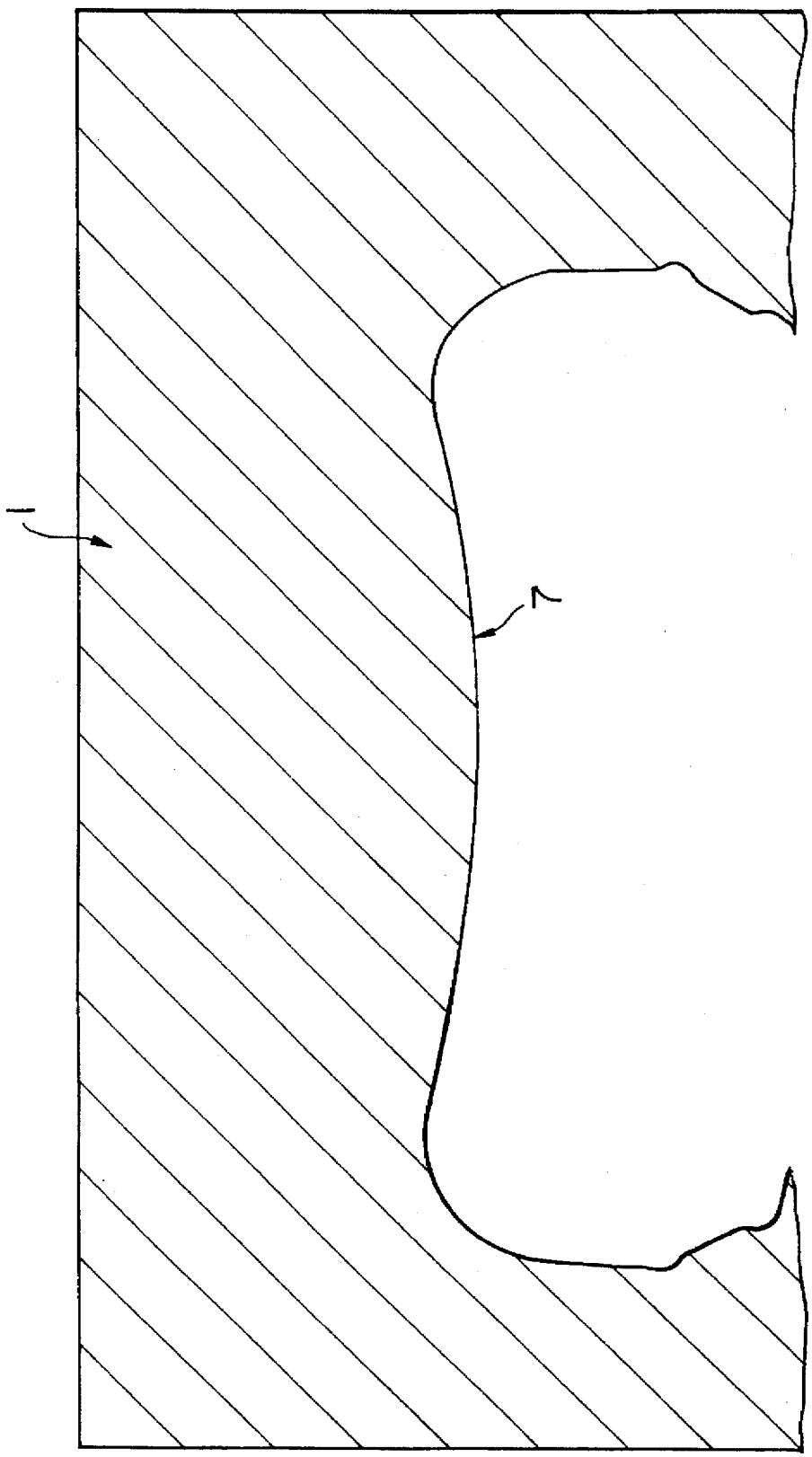
FIG. 1 is a cross-sectional view of a principal part of a mold of the present invention.
Figure 2:
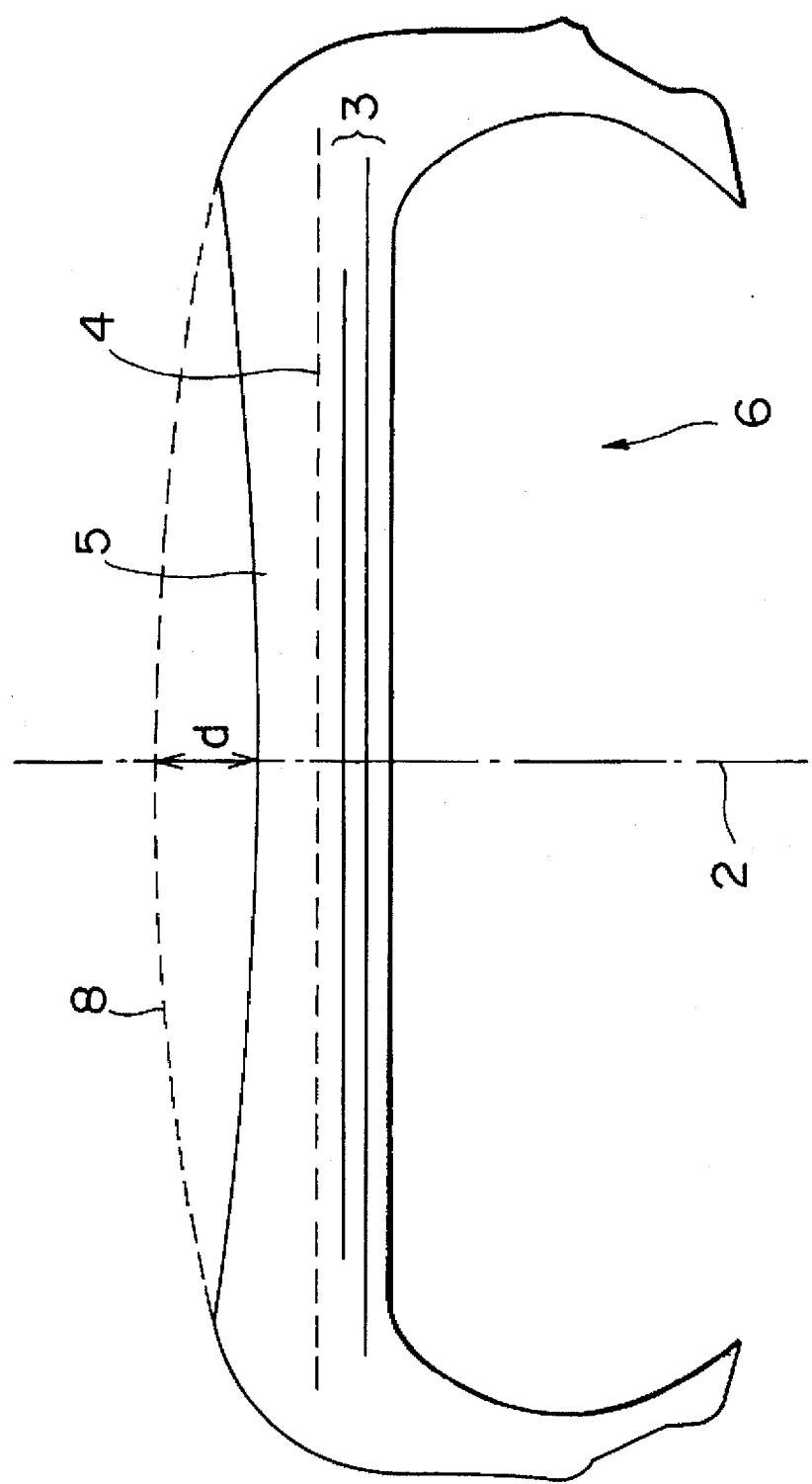
FIG. 2 is a cross-sectional view of a high performance tire before and after inflation with standard inner pressure, manufactured by a mold according to the present invention.

FIG. 1 shows the principal part of a mold 1 of the present invention having a mold surface 7, and FIG. 2 shows in cross-sectional a pneumatic tire 6 manufactured by the mold of the present invention, wherein the tire 6 has an equatorial plane 2, a belt 3, a belt reinforcing layer 4, and a tread portion 5. In FIG. 1 and 2, curvatures of cross-sectional profiles of the mold and the tire are exaggerated in order to better explain the invention.

The mold 1 is intended to be used for vulcanizing a pneumatic tire 6 having a size of 255/50R16 or more based on ISO standard and having, for reinforcing the tread portion 5, a belt 3 comprising two rubber coated cord layers having cords arranged obliquely at angles with respect to the equatorial plane 2 of the tire of 26° or more, and a belt reinforcing layer 4 arranged outside the belt 3 and comprising a single organic fiber cord layer having cords arranged substantially parallel with respect to the equatorial plane 2 of the tire.

The cross-sectional profile of a mold surface 7 facing the tread portion 5 has a radius smaller than that of a nominal tire cross-sectional profile by 1% or more of the section width 6 and forms a convex curve to a cavity.

In the size of the tire, "255/50R16 or more" means that the width of the tire in cross-section is 255 mm or more, the aspect ratio is not more than 50%, and the rim diameter is 16 inches or more.

In the high performance tire having a size of 255/50R16 or more, since cords are obliquely arranged at angles of 26° or more, if the conventional mold forming a concave curve to a cavity is used, the radius of the tire inflated with standard inner pressure tends to enlarge compared with a nominal radius of the tire.

Figure 4:
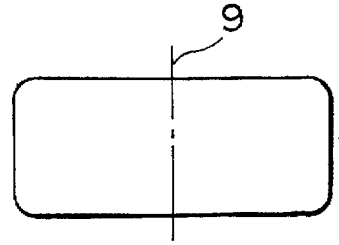
FIG. 4 is a foot-print of a high performance tire manufactured by the mold of FIG. 1.

If the radius of the high performance tire enlarges compared with the nominal radius of the tire, a center area of the tread is grown (expanded) further than expected at an initial stage of abrasion. Thus, a contact pressure of the center area increases compared with that of a side area of the tread, and an ideal shape of a foot-print of the high performance tire, that is the shape with a rectangle ratio of 100% as shown in FIG. 4, cannot be obtained. Instead the foot-print becomes an elliptical shape as shown in FIG. 5.

Figure 5:
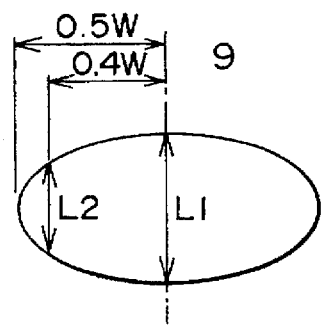
FIG. 5 is a foot-print of a high performance tire manufactured by a conventional mold.

The rectangle ratio is a percentage of a contact length L2 to a contact length L1 (L2/L1)×100%; wherein L1 is a contact length of the center 9 of the contact of the tire, and L2 is a contact length of a location 0.8 times half-width of the tire away from the center 9 of the contact in the foot-print, as illustrated in FIG. 5.

In the above mentioned high performance tire, since the center of the tread partially and largely wears at an initial stage of abrasion, the contact pressure of the side area of the tread tends to increase excessively at a middle stage of abrasion, which is disadvantageous.

The inventors rationalized a surface of a mold in order to prevent enlargement of the radius of the tire inflated with standard inner pressure compared with the nominal radius. The mold surface was determined by calculating a difference of the radius before and after inflation with standard inner pressure in order to make the radius of the high performance tire after inflation become the nominal radius 8 (broken line) as illustrated in FIG. 2. Although the difference of the radius depends on the construction of the belt reinforcing structure, etc., it is approximately 1% or more of tire section profile width W, and preferably 2% or less. Consequently, it was found that a section profile of a mold surface should have a convex curve to a cavity, that is the section profile of the tread facing this part of the mold should have a concave curve to a cavity. By manufacturing the tire using this mold, the radius of the tire after inflation with standard inner pressure becomes nearly the nominal radius, and an ideal foot-print with a rectangle ratio of approximately 100% can be obtained.

In a mold according to the present invention, a cross-sectional profile of a mold surface facing the tread portion has a radius smaller than that of a nominal tire cross-sectional profile by 1% or more (d) of a section width of the tire and forms a convex curve to a cavity. Consequently, the radius of the high performance tire after being inflated with standard inner pressure becomes the nominal radius. Thus, an ideal foot-print with a rectangle ratio of approximately 100% can be obtained.

In the above mentioned high performance tire, since a large centrifugal force is generated when running at high speed, taking advantage of relatively small circumferential force, it is possible to restrain excess increasing of a contact pressure of sides of the tread by growing the center portion of the tread intentionally at a middle stage of abrasion.

Figure 3:
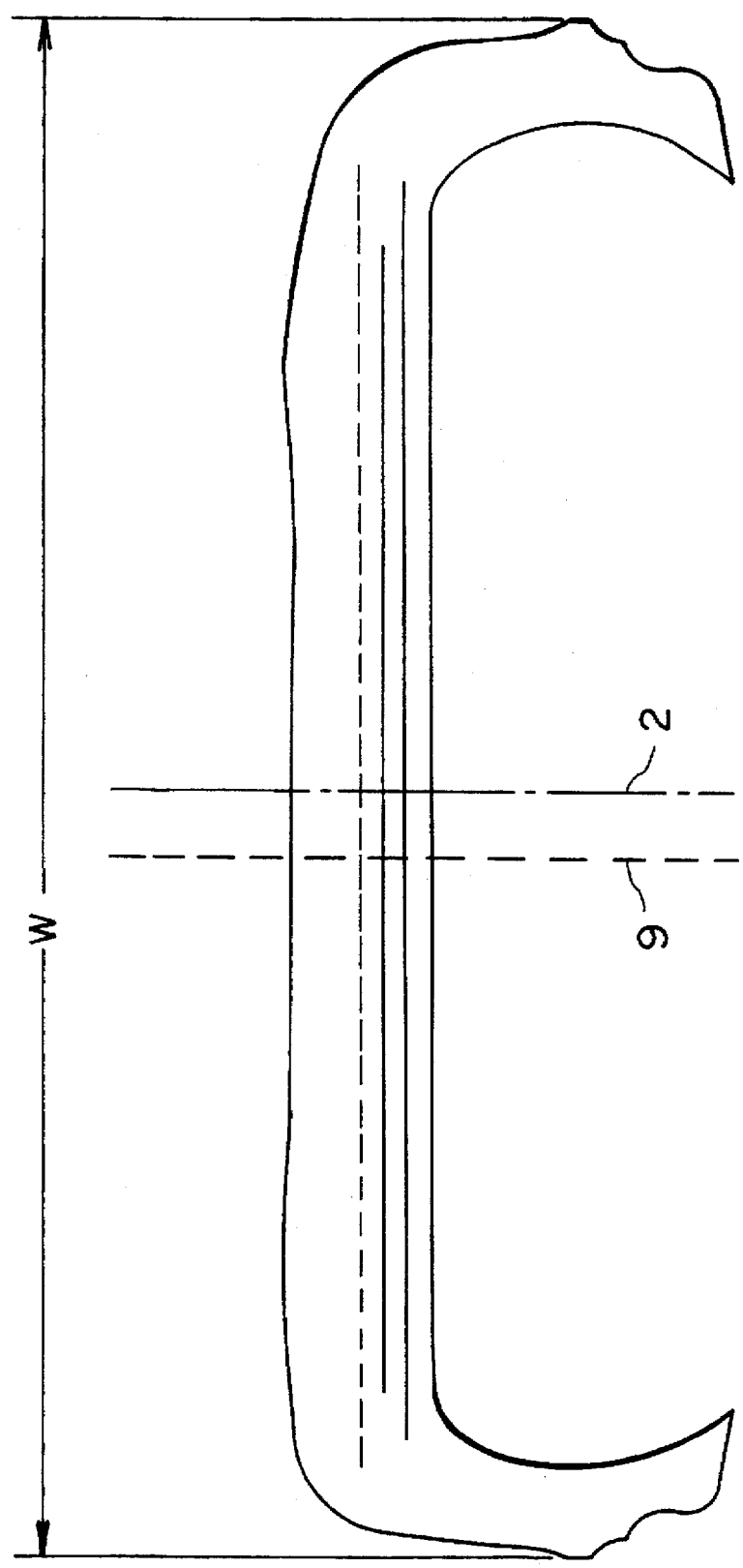
FIG. 3 is a cross-sectional view of a high performance tire manufactured by another mold according to the present invention.

Further, generally, in order to improve cornering performance, a foot-print shown in FIG. 6(b), which has wider contact width, is employed instead of a foot-print shown in FIG. 6(a). According to the present invention, by employing an asymmetric section profile of the tread portion 5, as shown in FIG. 3, which means shifting of the center of the foot-print to the outer side of a vehicle with respect to the center of the tire itself when mounted on a vehicle, it is possible to extend an actual tread distance x (distance between the center of the foot-prints of right and left tires) as shown in FIG. 6(c).

An embodiment according to the present invention will be explained with reference to FIG. 1. The size of a tire of a first embodiment was 265/40ZR18. For reinforcing a tread portion 5, there were used a belt 3 having cords arranged obliquely at angles with respect to an equatorial plane 2 of the tire of 34° and a belt reinforcing layer 4 arranged outside the belt 3 and comprising a single nylon cord layer having cords arranged substantially parallel with respect to the equatorial plane 2 of the tire. In the mold 1 used for manufacturing this tire, a cross-sectional profile of a mold surface 7 facing the tread portion 5 had a radius smaller than that of a nominal tire cross-sectional profile by 1.13% (3 mm) of a section width (W=265 mm) of the tire 7 and formed a convex curve to a cavity. In this tire, the center of the foot-print corresponded to the center of the tire itself. The rectangle ratio was 85%.

The size of a tire of a second embodiment was 335/30ZR18. For reinforcing a tread portion 5, there were used a belt 3 having cords arranged obliquely at angles with respect to an equatorial plane 2 of the tire of 34° and a belt reinforcing layer 4 arranged outside the belt 3 and comprising a single nylon cord layer having cords arranged substantially parallel with respect to the equatorial plane 2 of the tire. In the mold 1 used for manufacturing this tire, a cross-sectional profile of a mold surface 7 facing the tread portion 5 had a radius smaller than that of a nominal tire cross-sectional profile by 1.34% (4.5 mm) of a tire section width (W=335 mm) 6 and formed a convex curve to a cavity. In this tire, the center of the foot-print was shifted by 30 mm to the outer side of the vehicle with respect to the center of the tire itself when mounted on the vehicle. The rectangle ratio was 85%.

In a conventional tire 1, a section profile of a tread surface facing the tread portion formed a concave curve to a cavity, and a rectangle ratio was 50%. Otherwise the construction of the conventional tire i was the same as that of the first embodiment tire.

In a conventional tire 2, a cross-sectional profile of a tread surface facing the tread portion formed a concave curve to a cavity, and a rectangle ratio was 50%. Otherwise the construction of the conventional tire 2 was the same as that of the second embodiment tire.

Tests relating to cornering performance and high speed durability were carried out for the above mentioned sample tires after fitting to a vehicle.

In the tests, the cornering performance was evaluated based on side force G measured by a G meter when the tires fitted to the vehicle were running on a round course with a radius of 60 m.

The high speed durability was evaluated by rotating the above mentioned tires onto a drum under load.

The results are shown in Table 1 below. The results of the first embodiment are expressed using ratios on the basis that the corresponding values of the conventional tire 1 are 100. The results of the second embodiment are expressed using ratios on the basis that the corresponding values of the conventional tire 2 are 100. In the Table, the higher the values, the better the performance.

TABLE 1

|  | Conv. tire 1 | Embodiment tire 1 | Conv. tire 2 | Embodiment tire 2 |
| --- | --- | --- | --- | --- |
| Cornering performance | 100 | 105 | 100 | 107 |
| High Speed durability | 100 | 110 | 100 | 110 |

As can be seen from the Table, the embodiment tires 1 and 2 have excellent cornering performance and high speed durability, In the mold according to the present invention, a cross-sectional profile of a mold surface facing the tread portion has a radius smaller than that of a nominal tire cross-sectional profile by 1% or more of a section width of the tire and forms a convex curve to a cavity. Consequently, the radius of the high performance tire after being inflated with standard inner pressure becomes the nominal radius. Thus, an ideal foot-print with a rectangle ratio of approximately 100% can be obtained. Consequently, excellent cornering performance can be obtained, and the high speed durability can be improved because heat generation at the center of the tread is restrained.

In the above mentioned high performance tire, since large centrifugal force generates when running at high speed, taking advantage of relatively small circumferential force, it is possible to restrain excess increasing of a contact pressure of sides of the tread by growing the center portion of the tread intentionally at a middle stage of abrasion.

Figure 6:
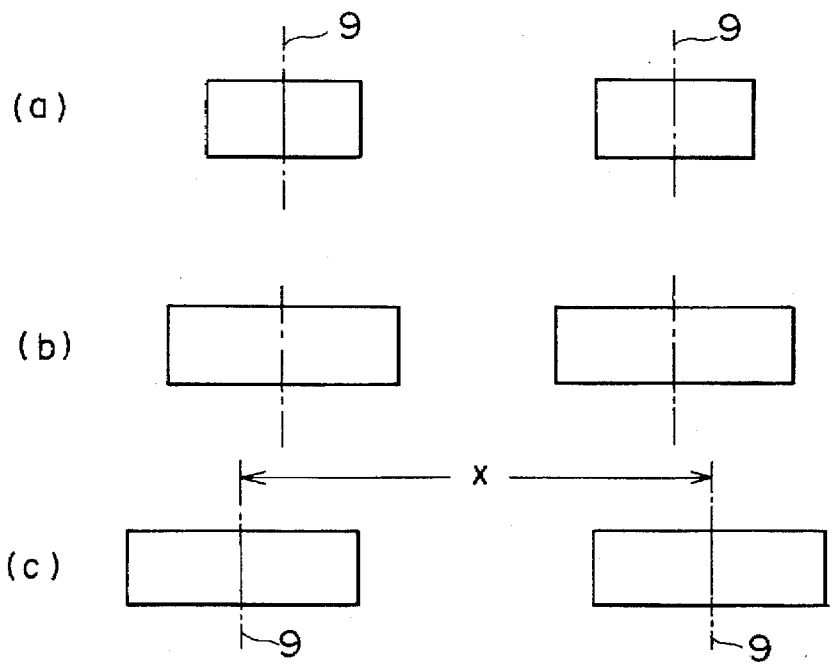
FIG. 6 shows right and left foot-prints of a rear tire when fitted to a vehicle, wherein (a) shows a normal tire, (b) shows a high performance tire, and (c) shows a high performance tire whose actual distance between the tread is extended.
Figure 7:
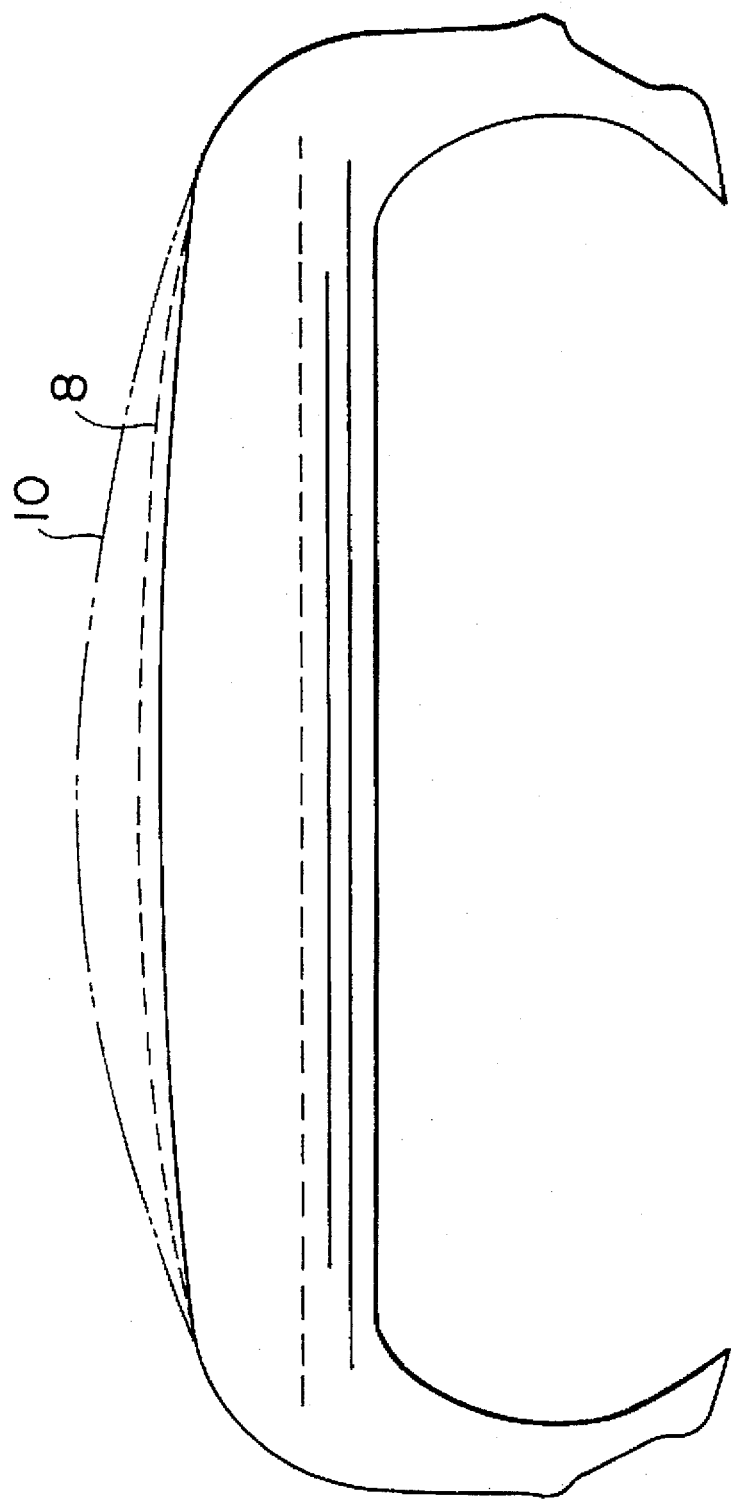
FIG. 7 is a cross-sectional view in a width direction of a high performance tire before and after inflation with standard inner pressure, manufactured by a conventional mold.

According to the present invention, by employing an asymmetric section profile of the tread portion 5, as shown in FIG. 3, which means shifting of the center of the foot-print to the outer side of a vehicle with respect to the center of the tire itself when mounted on the vehicle, it is possible to extend an actual tread distance x as shown in FIG. 6.

While the invention has been particularly shown and described with reference to certain preferred embodiments thereof, it will be understood by those skilled in the art that various changes and modifications may be made without departing from the spirit and scope of the invention.

We claim:

1. An uninflated low aspect ratio pneumatic tire the aspect ratio of which is not more than 50% and having, for reinforcing a tread portion, a belt comprising at least two rubber coated cord layers having cords arranged obliquely at angles with respect to an equatorial plane of the tire of at least 26°, and a belt reinforcing layer arranged outside the belt and comprising at least one organic fiber cord layer having cords arranged substantially parallel with respect to the equatorial plane of the tire, said tire made by a method comprising the steps of; providing a mold having a cross-sectional profile of a mold surface facing the tread portion of the tire with a radius smaller than that of a nominal cross-sectional profile of said tire by at least 1% of a section width of the molded tire in its substantially uninflated state, said mold surface forming a convex curve to a cavity in said mold, and molding said low aspect ratio tire.

2. The tire of claim 1 wherein said mold surface cross-sectional profile facing the tread portion of the tire is asymmetric such that a center of a tread foot-print of said tire after inflation with standard inner pressure is shifted with respect to a tread center of said tire.

3. The tire of claim 1, wherein the cross-sectional profile of the mold surface facing the tread portion has a radius smaller than that of said nominal cross-sectional profile of said tire by at least 1% and not more than 2% of the section width of the molded tire in its substantially uninflated state.

4. In a method of making a low aspect ratio pneumatic tire the aspect ratio of which is not more than 50% and having, for reinforcing a tread portion, a belt comprising at least two rubber coated cord layers having cords arranged obliquely at angles with respect to an equatorial plane of the tire of at least 26°, and a belt reinforcing layer arranged outside the belt and comprising at least one organic fiber cord layer having cords arranged substantially parallel with respect to the equatorial plane of the tire, the improvement comprising the steps of providing a mold having a cross-sectional profile of a mold surface facing the tread portion of the tire to be molded with a radius smaller than that of a nominal cross-sectional profile of said tire by at least 1% of a section width of the molded tire substantially in its uninflated state, said mold surface forming a convex curve to a cavity in said mold, and molding said low aspect ratio tire.

5. The method according to claim 4, wherein the cross-sectional profile of the mold surface facing the tread portion of the tire to be molded has a radius smaller than that of said nominal cross-sectional profile of said tire by at least 1% and not more than 2% of the section width of the molded tire substantially in its uninflated state.

6. The method of claim 4 wherein said mold surface cross-sectional profile facing the tread portion of the tire to be molded is asymmetric such that a center of a tread foot-print of said molded tire after inflation with standard inner pressure is shifted with respect to a tread center of said tire.

* * * * *